(12) United States Patent
Hayashi et al.

(10) Patent No.: US 7,049,924 B2
(45) Date of Patent: May 23, 2006

(54) ELECTROMAGNETIC INDUCTION TYPE POSITION SENSOR

(75) Inventors: Yasukazu Hayashi, Aichi (JP); Noriyuki Fukui, Aichi (JP)

(73) Assignee: Okuma Corporation, Aichi (JP)

( * ) Notice: Subject to any disclaimer, the term of this patent is extended or adjusted under 35 U.S.C. 154(b) by 0 days.

(21) Appl. No.: 11/170,654

(22) Filed: Jun. 29, 2005

(65) Prior Publication Data

US 2006/0001518 A1  Jan. 5, 2006

(30) Foreign Application Priority Data

Jun. 30, 2004 (JP) ............................. 2004-194159

(51) Int. Cl.
 *H01F 5/00* (2006.01)
(52) U.S. Cl. .................. 336/200; 324/207.17
(58) Field of Classification Search ................ 336/200, 336/232; 324/207.11–26
 See application file for complete search history.

(56) References Cited

U.S. PATENT DOCUMENTS

| | | | |
|---|---|---|---|
| 4,887,465 A | 12/1989 | Bryne et al. | |
| 4,893,077 A * | 1/1990 | Auchterlonie | 324/207.17 |
| 5,003,260 A * | 3/1991 | Auchterlonie | 324/207.16 |
| 5,327,077 A | 7/1994 | Honda | |
| 5,804,963 A | 9/1998 | Meyer | |
| 6,011,389 A | 1/2000 | Masreliez et al. | |
| 6,111,402 A * | 8/2000 | Fischer | 324/207.17 |
| 6,201,387 B1 * | 3/2001 | Govari | 324/207.17 |
| 6,236,199 B1 * | 5/2001 | Irle et al. | 324/207.17 |
| 6,636,035 B1 * | 10/2003 | Kiriyama et al. | 324/207.17 |
| 6,646,433 B1 * | 11/2003 | Milvich | 324/207.17 |
| 6,720,760 B1 * | 4/2004 | Milvich | 324/207.17 |

FOREIGN PATENT DOCUMENTS

| | | |
|---|---|---|
| JP | 62274215 | 11/1987 |
| JP | 63024124 | 2/1988 |
| JP | 5180664 | 7/1993 |
| JP | 8021744 | 1/1996 |
| JP | 8313295 | 11/1996 |
| JP | 9210611 | 8/1997 |

* cited by examiner

*Primary Examiner*—Tuyen T Nguyen
(74) *Attorney, Agent, or Firm*—Gauthier & Connors LLP

(57) ABSTRACT

An electromagnetic induction type position sensor comprises an AC magnetic flux generating device which generates AC magnetic flux substantially at a wavelength $\lambda$, and a plurality of coils which receives the AC magnetic flux to output electromagnetic induction voltages. Each coil includes a plurality of sinusoidal conductive patterns at a wavelength $\lambda$ formed in each of an even number of layers laminated via insulating materials. The plurality of conductive patterns formed in a same layer is arranged with a space between them in an amplitude direction of the sinusoidal shape, and is formed at the same position as a plurality of conductive patterns formed in another adjacent layer, and its amplitude is in a reverse phase to that of the plurality of conductive patterns formed in the other adjacent layer. All the conductive patterns constituting the same coil are connected in series so that a direction of an electric current of these conductive patterns is opposite to that of the conductive patterns in reverse phases when viewed from the front of the layers.

4 Claims, 4 Drawing Sheets

ELECTROMAGNETIC INDUCTION TYPE POSITION SENSOR

PRIORITY INFORMATION

This application claims priority to Japanese Patent Application No. 2004-194159, filed Jun. 30, 2004, which is incorporated herein by reference in its entirety.

BACKGROUND OF THE INVENTION

1. Field of the Invention

The present invention relates to an electromagnetic induction type position sensor which detects the position of movable members using an electromagnetic induction function.

2. Description of the Related Art

Position sensors measuring magnetic properties to detect, for example, the position of a main shaft of a machine tool have heretofore been known. In a typical such position sensor, a scale, which is a cylinder made of a soft magnetic material whose outer periphery is indented, is fixed to a rotating shaft; any change in the reluctance of the scale outer periphery is converted into an electric signal; and a relative position is thereby detected. Because such a position sensor bases positional detection on magnetic properties, this type of sensor inherently excels in resistance to exposure to common environmental contaminants such as water, oil, etc. Such a position sensor also allows scales of different sizes to be easily manufactured by machining. Thus, there is a further advantage that it is not necessary to produce a different mold for each size.

A position sensor as described above is described in, for example, Japanese Patent Publication Laid-open No. 62-274215, which discloses a sensor wherein a permanent magnet is combined with a magnetoresistive element, and a reluctance change of the scale is detected as an electric signal based on a resistance change. Another sensor to detect a change of a magnetic flux due to the reluctance change of the scale is disclosed in Japanese Patent Publication Laid-open No. 5-180664 and Japanese Patent Publication Laid-open No. 8-21744. The sensor described therein utilizes an electromagnetic induction function, wherein a plurality of coils is formed by conductive patterns using, for example, a printed board technology, and these coils are used to detect the change of reluctance as an amplitude change of an AC magnetic flux. Further, Japanese Patent Publication Laid-open No. 8-313295 shows that the sinusoidal shape of the conductive pattern allows the amplitude change of an electromagnetic induction voltage output by the coil to be approximate to a sinusoidal wave with regard to the positional change. Still further, Japanese Patent Publication Laid-open No. 9-210611 discloses a method wherein the coil formed by the sinusoidal conductive pattern is an inwrought coil so that a plurality of coils is mounted at nearly the same location with a high density.

In the meantime, there has also recently been a marked increase in the use of machine tools performing a composite process. In the main shaft of a composite process machine, a process target fixed to the main shaft side is accurately rotated, and outline processing is performed with a rotating tool. Such a processing application requires that a rotational position of the main shaft or the like be accurately detected. However, the position sensor using the magnetoresistive element disclosed in Japanese Patent Publication Laid-open No. 62-274215, which is widely used as the position sensor for the main shaft, is not suitable for highly accurate position detection because of unsatisfactory temperature characteristics of the magnetoresistive element. Moreover, the use of the permanent magnet can be problematic in that iron powder produced, for example, by the machine work, tends to stick to sensor surfaces, where its presence reduces the accuracy of detection.

On the other hand, the position sensor using the plurality of coils as described above does not have the problem of sticking iron powder, and has significantly more stable temperature characteristics. Further, the sinusoidal shape of the coils makes it possible to obtain a signal amplitude change close to the sinusoidal shape for positional displacement. It is for this reason characterized in that the position in a scale indentation pitch can be detected with a high resolution by interpolation processing of the amplitude change of a plurality of detection signals. However, a problem with a sensor using a plurality of coils is that the unamplified output signal level is low, such that, if the indentation pitch of the scale is reduced for higher accuracy, the detectable signal level will be extremely low. Thus, a smaller indentation pitch of the scale has led to a lower signal-noise ratio. In addition, even with the reduced indentation pitch, detection resolution in the indentation pitch will decrease due to noise, so that it is difficult to increase the accuracy.

Furthermore, when, for example, printed circuit board technology is used to arrange the coils of the sinusoidal conductive patterns having a short wavelength, there is also a problem that an inwrought coil can not be implemented because for the footprint of an interlayer connection is several times larger than a conductor width (thickness of the conductive pattern). Thus, in order to implement the position sensor capable of handling the scale with a small indentation pitch, the plurality of coils must be arranged at different places. This has caused a problem that the area of the coils receiving the magnetic flux is reduced, leading to reduced detected signal level. Moreover, there is a problem that, although the inwrought coil can be implemented in the small indentation pitch, it is difficult to maintain the accuracy of the sinusoidal coil shape via a plurality of layers. Thus, there is also a problem that, even if the detected signal level can be increased by the inwrought coil, highly accurate positional detection in the indentation pitch becomes possible due to degraded coil shape accuracy.

In addition, as in Japanese Patent Publication Laid-open No. 8-313295, use is made of a coil in which two sinusoidal conductive patterns having a large amplitude in reverse phases are connected in series so as to perform highly accurate positional detection, in which case a coil and a scale are needed which generate an AC magnetic flux that is sufficiently great for the amplitude of the sinusoidal conductive patterns, resulting in a problem that the size of the position sensor is increased. The reason for this is that the farther the center where the magnetic flux is generated is, the less uniform the magnetic flux becomes in the coil generating the AC magnetic flux, so that if the coil to generate the AC magnetic flux is small, part of the sinusoidal conductive pattern is disposed even in a place where the magnetic flux change is great. Also, when the scale is small in a thickness direction, a portion of the sinusoidal conductive pattern is disposed at a location where the magnetic flux proximate to a scale edge rapidly changes, thus posing the same problem.

The present invention has been attained under such circumstances, and the present invention advantageously provides an electromagnetic induction type position sensor which is smaller and more accurate.

SUMMARY OF THE INVENTION

An electromagnetic induction type position sensor of the present invention comprises AC magnetic flux generating means for generating an AC magnetic flux which repeatedly becomes strong and weak substantially at a wavelength λ in a movement direction of a position detection target, and a plurality of coils which receives the AC magnetic flux to output electromagnetic induction voltages different from each other in phase of an amplitude change. Each coil includes a plurality of conductive patterns formed in each of an even number of layers laminated via insulating materials. Each conductive pattern has a sinusoidal shape at the wavelength λ extending in the movement direction of the position detection target. Further, each conductive pattern pairs with the sinusoidal conductive pattern in a reverse phase formed at the same position in another layer. Moreover, two or more conductive patterns of the plurality of conductive patterns constituting the same coil and formed in the same layer are adjacently arranged with a space between them in an amplitude direction of the sinusoidal shape. All the conductive patterns constituting the same coil are connected in series so that a direction of an electric current of these conductive patterns is opposite to that of the paired conductive patterns when viewed from the front.

DETAILED DESCRIPTION OF THE INVENTION

Figure 1:
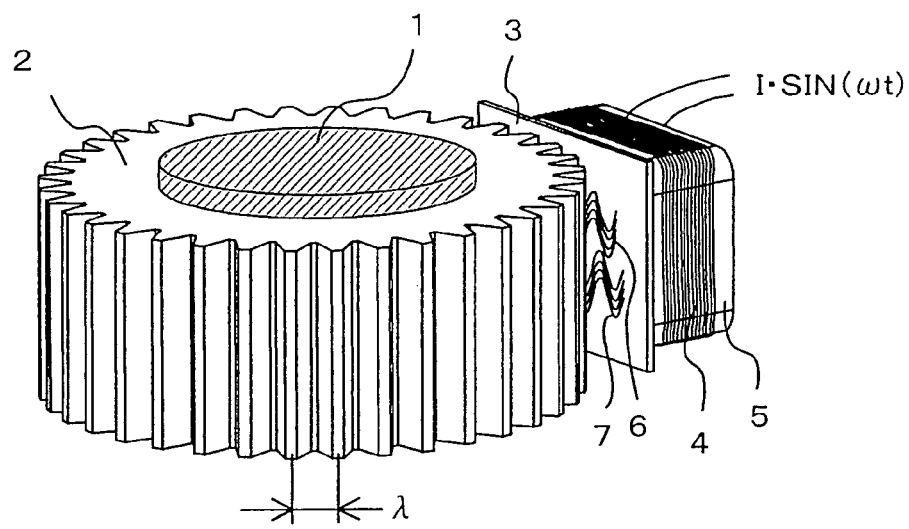
FIG. 1 is a perspective view showing an embodiment of an electromagnetic induction type position sensor.
Figure 2:
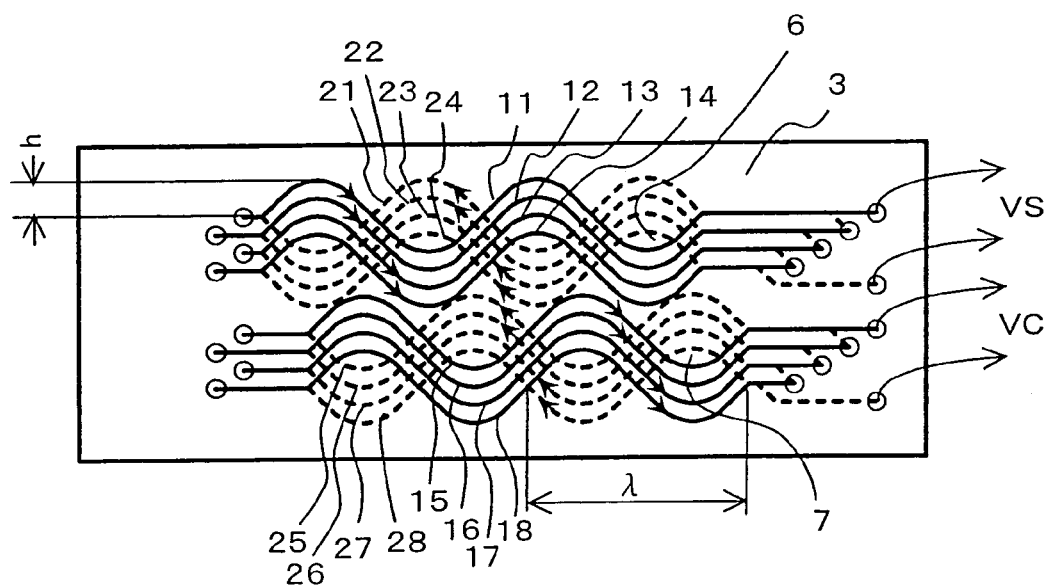
FIG. 2 is a diagram showing a coil shape of the electromagnetic induction type position sensor of FIG. 1.
Figure 3:
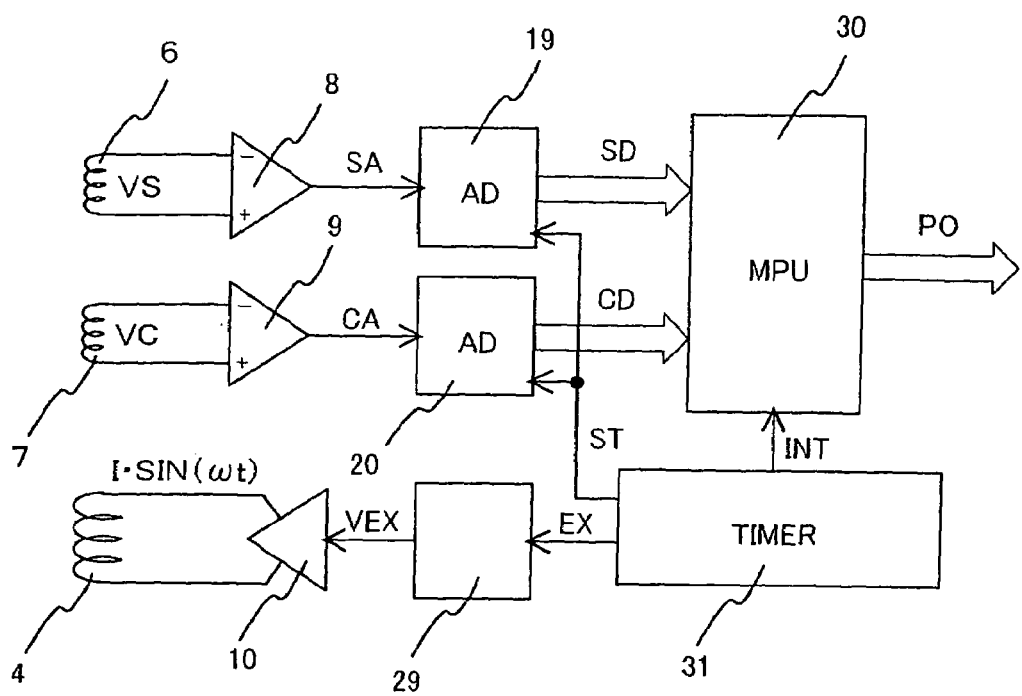
FIG. 3 is a block diagram showing one example of a signal processing circuit of an electromagnetic induction type position sensor of FIG. 1.

Embodiments of the present invention will be described below with reference to the drawings. FIG. 1 is a perspective view of an electromagnetic induction type position sensor in the embodiments of the present invention. FIG. 2 is a diagram showing a coil shape of a sensor substrate 3 of FIG. 1. FIG. 3 is a block diagram showing one example of a signal processing circuit to process a signal from the electromagnetic induction type position sensor of FIG. 1.

A scale 2 is made of, for example, a cylindrical iron material which is a soft magnetic material, and is secured to a rotating shaft 1. Further, the scale 2 is gear-shaped, having 36 indentations substantially at a pitch λ along its outer periphery. An electromagnet 5 wound with a coil 4 is made of, for example, a soft magnetic material such as ferrite having good high frequency properties. The coil 4 performs waveform shaping from an exciting pulse signal EX generated by a timer 31 shown in FIG. 3 into a sinusoidal exciting signal VEX via a waveform shaping circuit 29. Further, the sinusoidal exciting signal VEX is input to an electric current amplifier 10. The electric current amplifier 10 amplifies the sinusoidal exciting signal VEX to pass a sinusoidal AC exciting current I·SIN (ωt) to the coil 4. Thus, the electromagnet 5 generates an AC magnetic flux toward an indented surface of the scale 2. At this time, in the vicinity of the surface of the scale 2, the AC magnetic flux which repeatedly becomes strong and weak substantially at a pitch of a wavelength λ in a rotation direction of the scale 2 in accordance with reluctance changes due to the indentations on the surface. That is, the electromagnet 5 and the scale 2 function as AC magnetic flux generating means for generating the AC magnetic flux which repeatedly becomes strong and weak substantially at the wavelength λ in a movement direction of a position detection target (rotating shaft 1).

The sensor substrate 3 is disposed so as to be sandwiched between the electromagnet 5 and the outer peripheral surface of the scale 2, and is fixed to the electromagnet 5 side with a predetermined gap between the sensor substrate 3 and the scale 2. The sensor substrate 3 comprises a printed board having a two-layer structure, wherein a conductive pattern in a first layer which is a surface layer and a conductive pattern in a second layer are fixed via a sheet-shaped insulating material, and interlayer connection of these conductive patterns forms two coils: a coil 6 and a coil 7. The coil 6 comprises eight conductive patterns (11, 12, 13, 14, 21, 22, 23, 24) shown in the upper half of FIG. 2, and the coil 7 comprises eight conductive patterns (15, 16, 17, 18, 25, 26, 27, 28) shown in the lower half of FIG. 2. Each conductive pattern has a sinusoidal shape at an amplitude h. At the same position of the first layer and the second layer, there are arranged eight pairs of sinusoidal conductive patterns (11 and 21, 12 and 22, 13 and 23, 14 and 24, 15 and 25, 16 and 26, 17 and 27, 18 and 28) having shapes in phases reverse to each other. Hereinafter, the conductive patterns in the first layer and the second layer formed at the same position (e.g., 11 and 21, 12 and 22, etc.) are referred to as "a pair of conductive patterns". In the present embodiment, one coil comprises four pairs of conductive patterns (11 and 21, 12 and 22, 13 and 23, 14 and 24, or, 15 and 25, 16 and 26, 17 and 27, 18 and 28). Moreover, in the present embodiment, as there are two coils, two sets of four pairs of conductive patterns are formed in the sensor substrate 3. All of the conductive patterns in the same layer constituting the same coil are in the same phase, and are arranged at regular intervals between them in a direction (amplitude direction of the sinusoidal shape of the conductive patterns) vertical to the movement direction of the scale 2. The conductive patterns constituting the coil 6 have a phase shifted by π/2 (λ/4) from that of the conductive patterns constituting the coil 7. Specifically, the phases are different by π/2 (λ/4) between the sinusoidal conductive patterns 11, 12, 13, 14 and the sinusoidal conductive patterns 15, 16, 17, 18, and between the sinusoidal conductive patterns 21, 22, 23, 24 and the sinusoidal conductive patterns 25, 26, 27, 28.

Next, the connecting of the eight conductive patterns (e.g., 11, 12, 13, 14, 21, 22, 23, 24) constituting one coil will be explained. The eight conductive patterns constituting one coil are serially connected by the conductive patterns other than the sinusoidal conductive patterns at both ends and by interlayer connection (through-holes), in order to form one coil. This serial connection is achieved such that, when viewed from the front of the sensor substrate 3, the direction of the electric current when passed through the coil is the same all in the four conductive patterns (e.g., 11, 12, 13, 14) in the first layer, and the direction in the four sinusoidal conductive patterns (e.g., 21, 22, 23, 24) in the second layer is opposite to the direction in the first layer (see arrows in FIG. 2). That is, right ends of the conductive patterns in the first layer are connected in series to left ends of the conductive patterns in the second layer, and left ends of the conductive patterns in the first layer are connected in series to right ends of the conductive patterns in the second layer.

Next, an example of the electromagnetic induction type position sensor performing position detection of the rotating shaft 1 will be explained. First, the scale 2 and the electromagnet 5 generate the AC magnetic flux which repeatedly becomes strong and weak at the pitch of the wavelength λ in the vicinity of the surface of the scale 2. When the coils 6, 7 receive this AC magnetic flux, electromagnetic induction voltages VS, VC shown in Equations (1), (2) are generated from the coils 6, 7 by an electromagnetic induction function with respect to a rotation angle θ of the scale.

[Formula 1]

$$VS = A * \text{SIN}(36\theta) * \text{COS}(\omega t) \quad (1)$$

$$VC = A * \text{COS}(36\theta) * \text{COS}(\omega t) \quad (2)$$

A is a coefficient indicating the magnitude of amplitude.

The electromagnetic induction voltages VS, VC generated by the coils 6, 7 are amplified in differential amplifiers 8, 9, respectively, and output as voltage signals SA, CA. The voltage signals SA, CA are converted into digital signals SD, CD in A/D converters 19, 20 by an A/D conversion start signal ST from the timer 31 at the time when COS (ωt)=1. At this time, the digital signals SD, CD are as in Equations (3), (4).

[Formula 2]

$$SD = B * \text{SIN}(36\theta) * \text{COS}(\omega t) \quad (3)$$

$$CD = B * \text{COS}(36\theta) * \text{COS}(\omega t) \quad (4)$$

B is a coefficient indicating the magnitude of amplitude.

In a microprocessor 30, when an interrupt signal INT from the timer 31 is input, a bivariate arctangent operation is performed with the digital signals SD, CD as inputs, thereby obtaining 36θ indicating, as a numerical value, a rotational position of a 1/36 rotation of the scale 2 (position within one pitch of the indentations of the scale 2. Further, in the microprocessor 30, a rotation amount over the 1/36 rotation of the scale 2 is also obtained by incremental processing from the obtained change of 36θ, and, as a result of the above processing, a digital signal PO is output which indicates the rotational position within one rotation of the rotating shaft 1.

Figure 4:
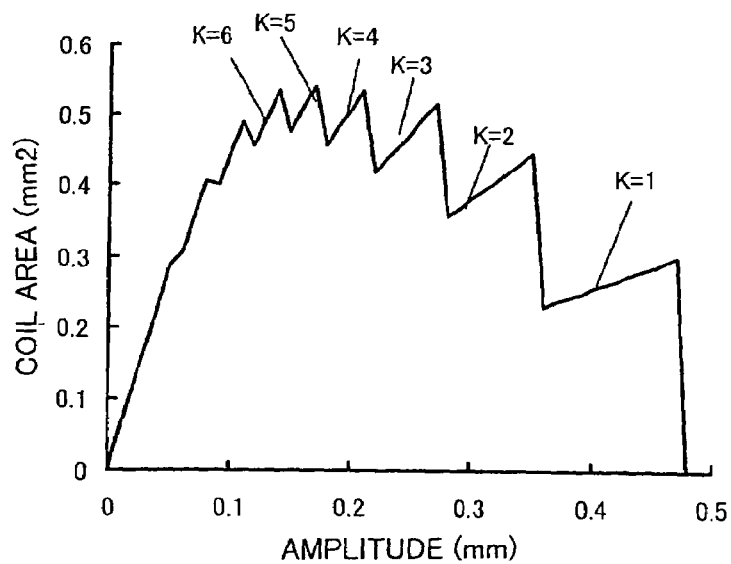
FIG. 4 is a diagram showing the relation between the amplitude and a coil area.

Next, the relation between the amplitude of the conductive patterns and a coil area will be explained referring to FIG. 4. FIG. 4 is a diagram showing the relation between the amplitude and the coil area. That is, it shows the coil area when the amplitude of the conductive patterns is changed. Here, in FIG. 4, under conditions of a pattern arrangement region including a conductor width of 0.1 mm, an inter-pattern minimum gap of 0.1 mm and an amplitude direction distance of 1 mm, the area of a region enclosed by a pair of conductive patterns in a half wavelength is multiplied by a number K of a pair of conductive patterns that can be arranged at the maximum in the arrangement region at that amplitude, thereby calculating a value as the coil area. Naturally, the area of the region enclosed by a pair of conductive patterns in a half wavelength is greater at a higher amplitude. However, the number K of a pair of conductive patterns that can be arranged at the maximum in the arrangement region is smaller at a higher amplitude. In the graph of FIG. 4, K=1 indicates a conventional pattern represented by, for example, FIG. 6B in Japanese Patent Publication Laid-open No. 63-24124. Further, in the same graph, K=4 indicates a pattern corresponding to the coil 6 or 7 of the sensor substrate 3 in FIG. 2. From the graph of FIG. 4, it can be understood that if the number K of pairs is a suitable number of two or higher, the coil area receiving the magnetic flux can be made larger than before. According to the present embodiment, because the amount of electromagnetic induction voltage output by the coil is proportionate to the coil area, it is possible to obtain an output signal greater than before. Moreover, in the present embodiment, because a plurality of conductive patterns is arranged at intervals in the amplitude direction, the amplitude of the conductive patterns can be lower than before. That is, even with a lower amplitude, a plurality of conductive patterns is arranged at intervals, so that the coil can receive the AC magnetic flux in a greater range as a whole. The conductive pattern has a shape with a low amplitude, so that if the axial thickness of the electromagnet and scale is small and if a change in axial magnetic flux distribution is great, an axial magnetic flux change in a pair of conductive patterns will be small. Thus, highly accurate position detection is possible as compared with the sinusoidal conductive patterns having a high amplitude. Therefore, the electromagnet and scale can be made smaller than before.

Figure 5:
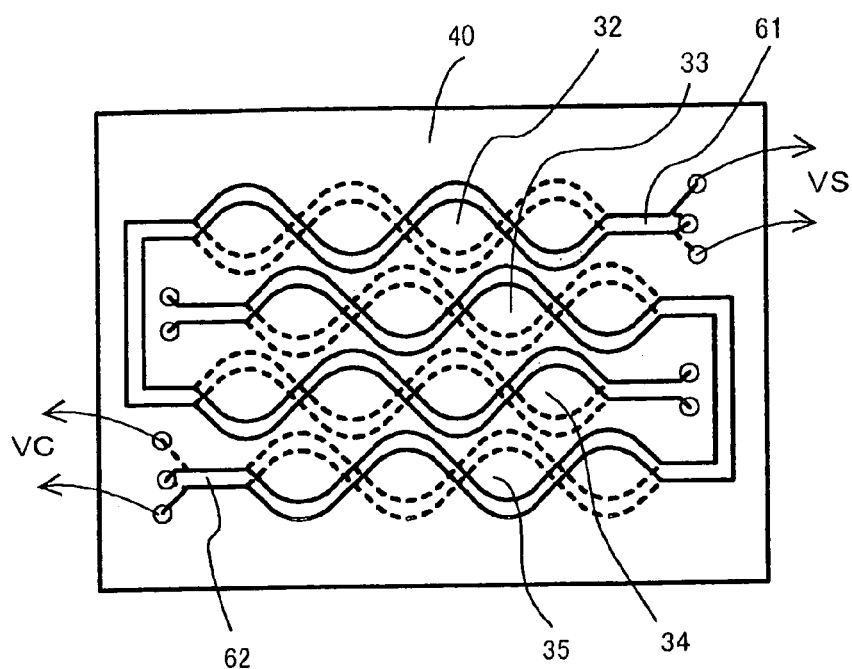
FIG. 5 is a diagram showing another coil shape of the electromagnetic induction type position sensor.
Figure 6:
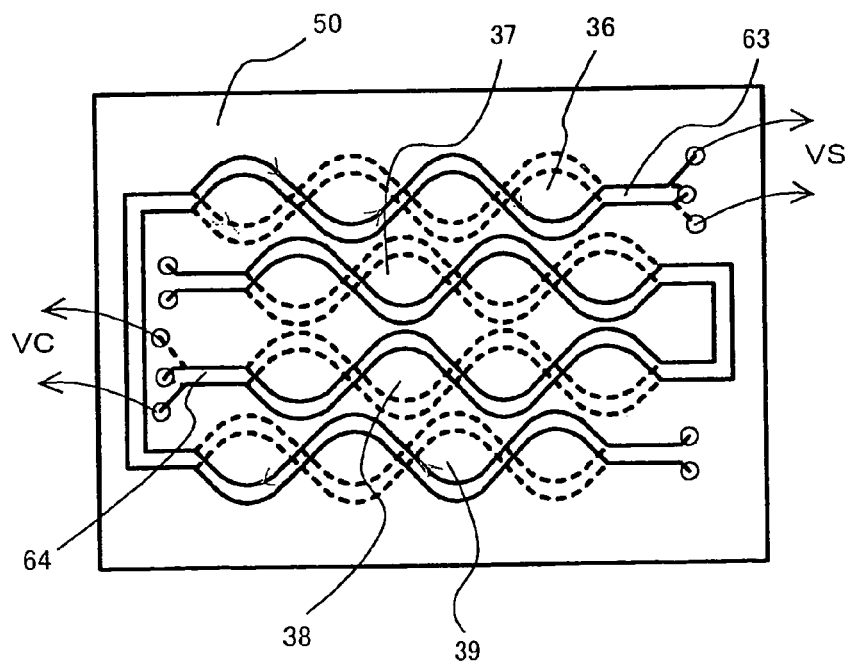
FIG. 6 is a diagram showing another coil shape of the electromagnetic induction type position sensor.
Figure 7:
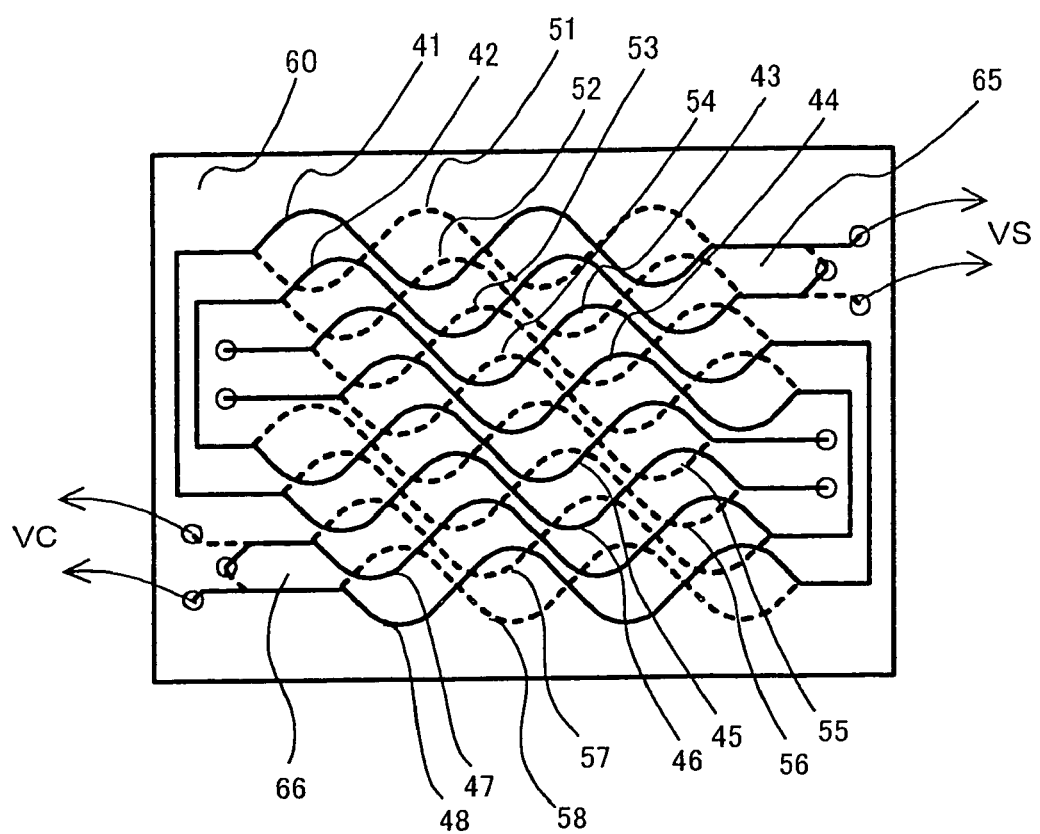
FIG. 7 is a diagram showing another coil shape of the electromagnetic induction type position sensor.

It is to be noted that, regarding the conductive patterns of the sensor substrate, the sensor substrate 3 in FIG. 1 can be replaced with a sensor substrate having the conductive patterns as shown in FIGS. 5, 6, and 7, in addition to the pattern shown in FIG. 2. These variations will be explained in a simple manner.

FIG. 5 is a diagram showing a sensor substrate according to a second embodiment. In a sensor substrate 40 of FIG. 5, there are arranged at regular intervals sinusoidal conductive pattern groups 32, 33, 34, 35 in which one group is composed of two pairs of conductive patterns corresponding to K=2 in the graph of FIG. 4. Further, the sinusoidal conductive pattern groups 32, 33 are connected in series to the sinusoidal conductive pattern groups 34, 35, respectively, thus forming two coils 61, 62. Thus, in the sensor substrate 40, centers of gravity of the coils 61, 62 can be located closer than those of the coils 6, 7 in FIG. 2. The closely located centers of gravity of the two coils makes it possible to restrict a decrease in position detection accuracy due to changes in signal amplitude balance and phase difference between the two signals VS and VC even if the sensor substrate is inclined in various directions.

Next, a third embodiment will be explained. In a sensor substrate 50 of FIG. 6, there are arranged sinusoidal conductive pattern groups 36, 37, 38, 39 in which one group is composed of two adjacent pairs of conductive patterns corresponding to K=2 in the graph of FIG. 4. Further, the sinusoidal conductive pattern groups 36, 35 are connected in series to the sinusoidal conductive pattern groups 39, 37, respectively, thus forming two coils 63, 64. Thus, in the sensor substrate 50, centers of gravity of the coils 63, 64 can be located closer than those of the coils 61, 62 in FIG. 5. However, in the sensor substrate 50, the conductive patterns of the coil 63 are disposed largely in outer peripheral parts where the change in the magnetic flux distribution is relatively great, leading to a disadvantage that characteristics of the two coils tend to be unbalanced.

Next, a fourth embodiment will be explained. In a first layer and a second layer of a sensor substrate 60 of FIG. 7, there are arranged eight pairs of sinusoidal conductive patterns (41 and 51, 42 and 52, 43 and 53, 44 and 54, 45 and 55, 46 and 56, 47 and 57, 48 and 58) having the wavelength λ at regular intervals in a direction (sinusoidal wave amplitude direction) vertical to the movement direction of the scale so that they are sequentially shifted by a regular phase difference $\pi/4$ ($\lambda/8$).

When one set of patterns is composed of two pairs of sinusoidal conductive patterns adjacent in the sinusoidal wave amplitude direction, four sets are possible, which include a set consisting of the sinusoidal conductive patterns 41, 42, 51, 52; a set consisting of 43, 44, 53, 54, a set consisting of 45, 46, 55, 56; and a set consisting of 47, 48, 57, 58. Four sinusoidal conductive patterns are connected in series so that, when viewed from the front of the sensor substrate 60, it appears as if all currents flowing through the sinusoidal conductive patterns of the same set in the first layer are in the same direction and as if currents flowing through the sinusoidal conductive patterns of the same set in the second layer are in the opposite direction to that of the counterpart sinusoidal conductive patterns in the first layer. Further, the set consisting of the sinusoidal conductive patterns 41, 42, 51, 52 is connected in series to the set consisting of 45, 46, 55, 56, and the set consisting of the sinusoidal conductive patterns 43, 44, 53, 54 is connected in series to the set consisting of 47, 48, 57, 58, thus forming two coils 65, 66. In this way, output signals similar to Equations (1), (2) can be obtained from the coils 65, 66 for the rotational position θ of the scale. It is to be noted that in the sensor substrate 60 of FIG. 7, the output signals similar to Equations (1), (2) can also be obtained when the sinusoidal conductive patterns within the above-described set are merely connected in series, for example, when VS is the output of the set consisting of the sinusoidal conductive patterns 41, 42, 51, 52 and VC is the output of the set consisting of the sinusoidal conductive patterns 43, 44, 53, 54.

When the sinusoidal conductive patterns with gradually varying phase difference are arranged in sequence as in the sensor substrate 60 of FIG. 7, the area of coils that can be arranged in a certain area decreases as compared with the example of FIG. 2. However, it is possible to obtain a signal of synthesized electromagnetic induction voltages generated by the phase-shifted sinusoidal conductive patterns, so that its averaging effect allows a reduction in distortion of an amplitude change due to a positional change, thereby enabling highly accurate position detection.

Although the preferred embodiments of the present invention have been described above using examples wherein the conductive patterns have a two-layer structure, the number of layers is not limited as long as the conductive patterns have a structure of even layers. Therefore, four-layer structures, six-layer structures, and the like may be employed. For example, in the sensor substrate in which the first layer and the second layer have the same structure as that in FIG. 2, the same sinusoidal conductive patterns as those in the second layer is added to a third layer and the same sinusoidal conductive patterns as those in the first layer is added to a fourth layer, so that they are connected in series in such a manner that currents in the same direction flow through the sinusoidal conductive patterns having the same phase shape at the same position, thereby enabling two coils having a four-layer structure. Moreover, the two coils have been described in the embodiments which output the voltages whose amplitude changes in different phases at $\pi/2$ with respect to the change in position, but the arrangement and phase of the sinusoidal conductive patterns may be changed so that three coils output voltages in three phases whose amplitude changes in different phases at $2\pi/3$ with respect to the position.

Furthermore, although examples were described wherein a soft magnetic material whose surface has the indentations substantially at the pitch $\lambda$ is used for the scale to generate the AC magnetic flux which repeatedly becomes strong and weak substantially at the pitch of the wavelength $\lambda$ with respect to a relative movement direction, other configurations are possible such as, for example, a conducting screen utilizing magnetic shielding effects by an eddy current, as shown in Japanese Patent Publication Laid-open No. 63-24124. In addition, the present invention is not limited to an electromagnetic induction type position sensor which detects the rotational position described in the examples of the embodiments, and, for example, an electromagnetic induction type position sensor for detecting a linear position can be constructed by configuring the scale as a rack-shaped member made of a soft magnetic material.

What is claimed is:

1. An electromagnetic induction type position sensor comprising:
    AC magnetic flux generating means for generating an AC magnetic flux which repeatedly becomes strong and weak substantially at a wavelength $\lambda$ in a movement direction of a position detection target; and
    a plurality of coils which receives the AC magnetic flux to output electromagnetic induction voltages different from each other in phase of an amplitude change,
    wherein each coil includes a plurality of conductive patterns formed in each of an even number of layers laminated via insulating materials,
    a shape of each conductive pattern is a sinusoidal shape at the wavelength $\lambda$ extending in the movement direction of the position detection target,
    each conductive pattern pairs with the sinusoidal conductive pattern in a reverse phase formed at the same position in another layer,
    two or more conductive patterns of the plurality of conductive patterns constituting a same coil and formed in the same layer are adjacently arranged with a space between them in an amplitude direction of the sinusoidal shape, and
    all of the conductive patterns constituting a same coil are connected in series so that a direction of an electric current of these conductive patterns is opposite to that of the paired conductive patterns when viewed from a front of the layers.

2. The electromagnetic induction type position sensor according to claim 1, wherein the two or more adjacently arranged conductive patterns have sinusoidal shapes in the same phase.

3. The electromagnetic induction type position sensor according to claim 1, wherein the two or more adjacently arranged conductive patterns have sinusoidal shapes with a sequential regular phase difference.

4. The electromagnetic induction type position sensor according to claim 1, wherein the AC magnetic flux transmitting means has:
    a scale made of a soft magnetic material whose surface has indentations at a pitch $\lambda$; and
    an electromagnet which emits an AC magnetic flux to the indented surface of the scale to generate an AC magnetic flux repeatedly becoming strong and weak at the wavelength $\lambda$ on the scale surface,
    the plurality of coils being arranged between the indented surface of the scale and the electromagnet.

* * * * *